United States Patent [19]

Bergmann et al.

[11] Patent Number: 4,563,520
[45] Date of Patent: Jan. 7, 1986

[54] METAL COMPLEXES OF DIS- OR TRISAZO COMPOUNDS CONTAINING A MIDDLE COMPONENT TWICE SUBSTITUTED BY HYDROXY AND/OR AMINO

[75] Inventors: Udo Bergmann, Darmstadt; Guenter Hansen, Ludwigshafen; Dietrich Lach, Friedelsheim; Georg Zeidler, Dannstadt-Schauernheim, all of Fed. Rep. of Germany

[73] Assignee: BASF Aktiengesellschaft, Ludwigshafen, Fed. Rep. of Germany

[21] Appl. No.: 435,661

[22] Filed: Oct. 21, 1982

[30] Foreign Application Priority Data

Oct. 28, 1981 [DE] Fed. Rep. of Germany ....... 3142608

[51] Int. Cl.[4] ...................... C09B 33/04; C09B 33/22; C09B 33/24; C09B 45/32
[52] U.S. Cl. .................................... 534/678; 260/510; 534/676; 534/677; 534/680; 534/684; 534/687; 534/688
[58] Field of Search .......... 260/145 A, 145 B, 145 C, 260/146 R, 148; 534/676, 677, 678, 684, 680

[56] References Cited

U.S. PATENT DOCUMENTS

| | | | |
|---|---|---|---|
| 2,045,090 | 6/1936 | Lange et al. | 260/145 C |
| 3,406,160 | 10/1968 | Wicki | 260/145 C |
| 4,263,229 | 4/1981 | Studer et al. | 260/145 A |

Primary Examiner—Floyd D. Higel
Attorney, Agent, or Firm—Oblon, Fisher, Spivak, McClelland & Maier

[57] ABSTRACT

Compounds containing sulfonic acid groups and of the general formula I

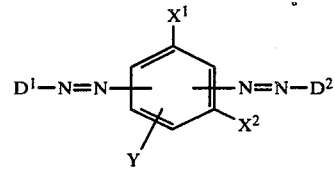

where $D^1$ is a radical of a diazo component, $X^1$ and $X^2$ independently of one another are each hydroxyl or unsubstituted or substituted amino, Y is hydrogen, chlorine, methyl, hydroxysulfonyl or a radical of the formula

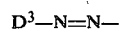

$$D^3-N=N-$$

and $D^2$ is a radical of the formula

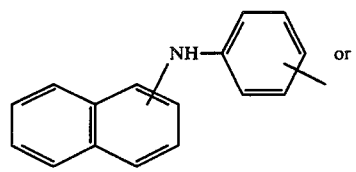

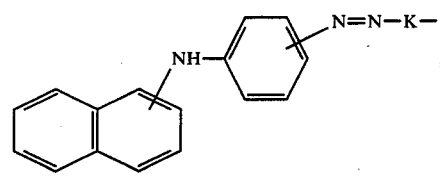

$D^3$ is a radical of a diazo component from the aniline or aminonaphthalene series, K is a radical of a coupling component from the benzene or naphthalene series, and the rings in the coupling component $D^2$ may furthermore be substituted by chlorine, methyl, methoxy, hydroxysulfonyl, aminosulfonyl, hydroxyl or acylamino, and metal complexes of such compounds, give very fast, brown dyeings, particularly on leather.

6 Claims, No Drawings

METAL COMPLEXES OF DIS- OR TRISAZO COMPOUNDS CONTAINING A MIDDLE COMPONENT TWICE SUBSTITUTED BY HYDROXY AND/OR AMINO

BACKGROUND OF THE INVENTION

Field of the Invention

The present invention relates to compounds containing sulfonic acid groups and of the general formula I

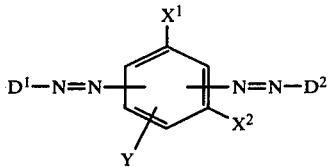

where $D^1$ is a radical of a diazo component, $X^1$ and $X^2$ independently of one another are each hydroxyl or unsubstituted or substituted amino, Y is hydrogen, chlorine, methyl, hydroxysulfonyl or a radical of the formula

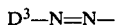

$$D^3—N=N—$$

and $D^2$ is a radical of the formula

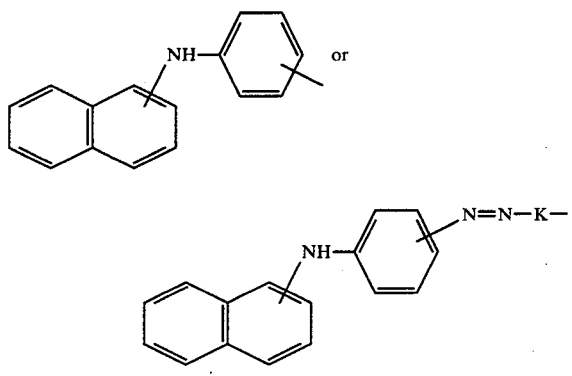

$D^3$ is a radical of a diazo component from the aniline or aminonaphthalene series, K is a radical of a coupling component from the benzene or naphthalene series, and the rings in the coupling component $D^2$ may be substituted by chlorine, methyl, methoxy, hydroxysulfonyl, aminosulfonyl, hydroxyl or acylamino, and to metal complexes of such compounds.

DESCRIPTION OF THE PREFERRED EMBODIMENTS

Examples of acylamino radicals for the rings in component $D^2$ are acetylamino, propionylamino and benzoylamino.

In a preferred embodiment of this invention $D^1$ is a radical of a diazo component, $X^1$ and $X^2$ independently of one another are each hydroxyl, amino, dimethylamino, diethylamino, dipropylamino, morpholino, piperidino, or pyrrolidino, Y is hydrogen, chlorine, methyl, hydroxysulfonyl, or $D^3$—N=N—, $D^2$ is a radical of the formula

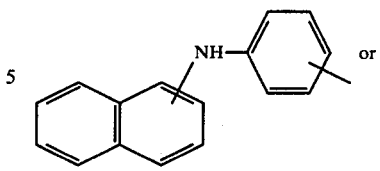

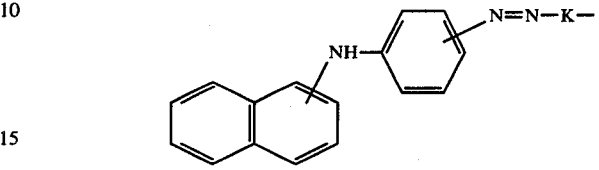

wherein either the phenyl ring or the naphthyl ring is substituted by hydroxysulfonyl, and the phenyl ring and the naphthyl ring are further unsubstituted or substituted by chlorine, methyl, methoxy, hydroxysulfonyl, aminosulfonyl, hydroxyl, acetylamino, propionylamino or benzoylamino, and K is a radical of a benzene or naphthalene coupling component in the form of a metal complex.

The radicals $D^1$ are derived predominantly from diazo components of the benzene and naphthalene series, and may be substituted in a conventional manner by, for example, fluorine, chlorine, bromine, nitro, cyano, substituted sulfonyl, hydroxysulfonyl, unsubstituted or substituted aminosulfonyl, hydroxyl, carboxyl, carboxylic acid ester, carboxylic acid amide, alkyl, alkoxy, phenoxy, substituted amino or acylamino, or phenylazo which is unsubstituted or substituted by chlorine, bromine, nitro or hydroxysulfonyl.

Preferably, $D^1$ is substituted in a position adjacent to the azo bridge by a group capable of forming a metal complex. Examples of suitable complex-forming substituents of this type are hydroxyl and carboxyl.

Specific examples of diazo components $D^1$-$NH_2$ are aniline, o-, m- and p-toluidine, o-, m- and p-chloroaniline, o-, m- and p-anisidine, o-, m- and p-nitroaniline, 2-nitro-4-methylaniline, 3-nitro-4-methylaniline, 2-nitro-4-chloroaniline, 2-methyl-5-nitroaniline, 2-methyl-4-nitroaniline, 2-chloro-4-nitroaniline, 2-methylsulfonyl-4-nitroaniline, aniline-o-, -m- and -p-sulfonic acid, 2-amino-3-chlorobenzenesulfonic acid, 2-amino-4-chlorobenzenesulfonic acid, 2-amino-5-chlorobenzenesulfonic acid, 3-amino-4-chlorobenzenesulfonic acid, 2-chloro-5-aminobenzenesulfonic acid, 3-chloro-4-aminobenzenesulfonic acid, 4-amino-3,6-dichlorobenzenesulfonic acid, 2-amino-5-methylbenzenesulfonic acid, 2-methyl-5-aminobenzenesulfonic acid, 2-methyl-4-aminobenzenesulfonic acid, 3-amino-4,6-dimethylbenzenesulfonic acid, 2-amino-5-methoxybenzenesulfonic acid, 2-methoxy-5-aminobenzenesulfonic acid, 2-amino-4-chloro-5-methylbenzenesulfonic acid, 2-amino-4-methyl-5-chlorobenzenesulfonic acid, 2-amino-5-nitrobenzenesulfonic acid, 3-nitro-4-aminobenzenesulfonic acid, aniline-2,4- and -2,5-disulfonic acid, 2-amino-4,5-disulfotoluene, 2-amino-3,5-disulfochlorobenzene, 2-amino-3,5-disulfotoluene, 2-amino-3,5-dimethylbenzenesulfonic acid, 4-amino-2,5-disulfoanisole, 2-amino-4-methoxybenzenesulfonic acid, 2-amino-4-methoxy-6-nitrobenzenesulfonic acid, 3-amino-6-methoxybenzenesulfonic acid, 2-amino-5-methoxybenzenesulfonic acid, 2-amino-5-ethoxy-benzenesulfonic acid, 2-sulfo-4-aminodiphenyl ether, 4-aminodiphenylamine-2-sulfonic acid, 4-nitro-4'-aminodiphenylamine-2-sulfonic acid, 4-nitro-3'-chloro-4'-amino-diphenylamine-2-sulfonic acid, 4-nitro-4'-aminodiphenyl-amine-3'-sulfonic acid, 4-methoxy-4'-aminodiphenylamine-2'-sulfonic acid, 4-hydroxy-4'-aminodiphenylamine-2'-sulfonic acid, 2-methoxy-4'-aminodiphenylamine-2'-sulfonic acid, 4-methyl-4'-aminodiphenylamine-2'-sulfonic acid, 4'-nitro-4-aminostilbene-2,2'-disulfonic acid, 2-amino-4-acetaminobenzenesulfonic acid, 2-amino-5-acetaminobenzenesulfonic acid and o-, m- and p-aminobenzoic acid, and the $C_1$-$C_4$-alkyl esters thereof, 2-amino-3,5-dichlorobenzoic acid, 2-amino-5-nitrobenzoic acid, 2-amino-5-hydroxysulfonylbenzoic acid, 2-amino-4-hydroxysulfonylbenzoic acid, aniline-3- and -4-sulfonamide, o- and p-aminobenzonitrile, acetmetamic and acetparamic acid, yellow acid and di-yellow acid, 4-aminoazotoluene-4'-sulfonic acid, 4-allylsulfonylaniline, 3-allylsulfonylaniline, 2-allylsulfonylaniline, 4-propen-1'-ylsulfonylaniline, 2-amino-5-sulfobenzoic acid, 3-amino-6-nitrobenzoic acid, 3-nitro-4-aminobenzoic acid, 2-naphthylamine-1-sulfonic acid, 2-naphthylamine-5-sulfonic acid, 2-naphthylamine-6-sulfonic acid, 2-naphthylamine-7-sulfonic acid, 2-naphthylamine-8-sulfonic acid, 2-naphthylamine-1,5-disulfonic acid, 2-naphthylamine-3,6-disulfonic acid, 2-naphthylamine-4,8-disulfonic acid, 2-naphthylamine-5,7-disulfonic acid, 2-naphthylamine-6,8-disulfonic acid, 2-naphthylamine-6-nitro-4,8-disulfonic acid, 2-naphthylamine-1,5,7-trisulfonic acid, 2-naphthylamine-3,6,8-trisulfonic acid, 2-naphthylamine-4,6,8-trisulfonic acid, 1-naphthylamine-2-sulfonic acid, 1-naphthylamine-3-sulfonic acid, 1-naphthylamine-4-sulfonic acid, 1-naphthylamine-5-sulfonic acid, 1-naphthylamine-6-sulfonic acid, 1-naphthylamine-7-sulfonic acid, 1-naphthylamine-8-sulfonic acid, 1-naphthylamine-3,6-disulfonic acid, 1-naphthylamine-3,8-disulfonic acid, 1-naphthylamine-4,7-disulfonic acid, 1-naphthylamine-4,8-disulfonic acid, 1-naphthylamine-3,6,8-trisulfonic acid, 1-naphthylamine-4,6,8-trisulfonic acid, 2-aminophenol, 2-amino-4-methylphenol, 2-amino-4-chlorophenol, 2-amino-4,6-dichlorophenol, 2-amino-3,4,6-trichlorophenol, 2-amino-4-nitrophenol, 2-amino-5-nitrophenol, 2-amino-4,6-dinitrophenol, 2-amino-4-chloro-5-nitrophenol, 2-amino-4-chloro-6-nitrophenol, 2-amino-4-nitro-6-chlorophenol, 2-amino-4-methyl-6-nitrophenol, 3-amino-4-hydroxybenzenesulfonic acid, 3-amino-4-hydroxybenzenesulfonamide, 3-amino-4-hydroxy-5-chlorobenzenesulfonic acid, 2-hydroxy-3-amino-5-chlorobenzenesulfonic acid, 2-hydroxy-3-amino-5-methylbenzenesulfonic acid, 3-amino-4-hydroxy-5-nitrobenzenesulfonic acid, 2-hydroxy-3-amino-5-nitrobenzenesulfonic acid, 2-aminophenol-4,6-disulfonic acid, 3-amino-4-hydroxy-5-carboxybenzenesulfonic acid, 2-amino-3-naphthol, 2-amino-3-naphthol-6-sulfonic acid, 6-nitro-1-diazo-2-naphthol-4-sulfonic acid and 1-diazo-2-naphthol-4-sulfonic acid.

Examples of substituted amino radicals $X^1$ and $X^2$ are dimethylamino, diethylamino, dipropylamino, morpholino, piperidino and pyrrolidino.

Specific examples of the compounds K-$NH_2$ are 1-naphthylamine, 1-naphthylamine-6-sulfonic acid, 1-naphthylamine-7-sulfonic acid, 1-amino-2-naphtholethyl ether, 1-naphthylamine-2-ethoxy-6-sulfonic acid, 1-amino-5-naphthol-7-sulfonic acid, 1-amino-8-naphthol-6-sulfonic acid, 1-amino-8-naphthol-2,4-disulfonic acid, 1-amino-8-naphthol-3,6-disulfonic acid, 1-amino-8-naphthol-4,6-disulfonic acid, 2-amino-5-naphthol-7-sulfonic acid, 2-amino-8-naphthol-6-sulfonic acid, 2-amino-5-naphthol-1,7-disulfonic acid, 2-amino-8-naphthol-6,8-disulfonic acid, 3-methylsulfonylaminoaniline, 2-methyl-5-methylsulfonylaminoaniline, 2-methoxy-5-methylsulfonylaminoaniline, 2-chloro-5-methylsulfonylaminoaniline, 2-amino-4-methylsulfonylaminobenzenesulfonic acid, 3-acetylaminoaniline, 2-methyl-5-acetylaminoaniline and 3-methoxy-5-acetylaminoaniline.

$D^3$ is preferably a simple diazo component from the benzene or naphthalene series.

Specific examples of diazo components $D^3$-$NH_2$ are aniline, o-, m- and p-toluidine, o-, m- and p-chloroaniline, o-, m- and p-anisidine, o-, m- and p-nitroaniline, 2-nitro-4-methylaniline, 3-nitro-4-methylaniline, 2-nitro-4-chloroaniline, 2-methyl-5-nitroaniline, 2-methyl-4-nitroaniline, 2-chloro-4-nitroaniline, 2-methylsulfonyl-4-nitroaniline, aniline-o-, -m- and -p-sulfonic acid, 2-amino-3-chlorobenzenesulfonic acid, 2-amino-4-chlorobenzenesulfonic acid, 2-amino-5-chlorobenzenesulfonic acid, 3-amino-4-chlorobenzenesulfonic acid, 2-chloro-5-aminobenzenesulfonic acid, 3-chloro-4-aminobenzenesulfonic acid, 4-amino-3,6-dichlorobenzenesulfonic acid, 2-amino-5-methylbenzenesulfonic acid, 2-methyl-5-aminobenzenesulfonic acid, 2-methyl-4-aminobenzenesulfonic acid, 3-amino-4,6-dimethylbenzenesulfonic acid, 2-amino-5-methoxybenzenesulfonic acid, 2-methoxy-5-aminobenzenesulfonic acid, 2-amino-4-chloro-5-methylbenzenesulfonic acid, 2-amino-4-methyl-5-chlorobenzenesulfonic acid, 2-amino-5-nitrobenzenesulfonic acid, 3-nitro-4-aminobenzenesulfonic acid, aniline-2,4- and -2,5-disulfonic acid, 2-amino-4,5-disulfotoluene, 2-amino-3,5-disulfochlorobenzene, 2-amino-3,5-disulfotoluene, 2-amino-3,5-dimethylbenzenesulfonic acid, 4-amino-2,5-disulfoanisole, 2-amino-4-methoxybenzenesulfonic acid, 2-amino-4-methoxy-6-nitrobenzenesulfonic acid, 3-amino-6-methoxybenzenesulfonic acid, 2-amino-5-methoxybenzenesulfonic acid, 2-amino-5-ethoxybenzenesulfonic acid, 4-aminodiphenylamine-2-sulfonic acid, 4-nitro-4'-aminodiphenylamine-2-sulfonic acid, 2-amino-4-acetaminobenzenesulfonic acid, 2-amino-5-acetaminobenzenesulfonic acid, aniline-3- and -4-sulfonamide, o- and p-aminobenzonitrile, acetmetamic and acetparamic acid, 2-amino-4-methylphenol, 2-amino-4-chlorophenol, 2-amino-4,6-dichlorophenol, 2-amino-3,4,6-trichlorophenol, 2-amino-4-nitrophenol, 2-amino-5-nitrophenol, 2-amino-4,6-dinitrophenol, 2-amino-4-chloro-5-nitrophenol, 2-amino-4-chloro-6-nitrophenol, 2-amino-4-nitro-6-chlorophenol, 2-amino-4-methyl-6-nitrophenol, 3-amino-4-hydroxybenzenesulfonic acid, 3-amino-4-hydroxybenzenesulfonamide, 3-amino-4-hydroxy-5-chlorobenzenesulfonic acid, 2-hydroxy-3-amino-5-chlorobenzenesulfonic acid, 2-hydroxy-3-amino-5-methylbenzenesulfonic acid, 3-amino-4-hydroxy-5-nitrobenzenesulfonic acid, 2-hydroxy-3-amino-5-nitrobenzenesulfonic acid, 1-naphthylamine-2-sulfonic acid, 1-naphthylamine-3-sulfonic acid, 1-naphthylamine-4-sulfonic acid, 1-naphthylamine-5-sulfonic acid, 1-naphthylamine-6-sulfonic acid, 1-naphthylamine-7-sulfonic acid, 1-naphthylamine-8-sulfonic acid, 2-naphthylamine-1-sulfonic acid, 2-naphthylamine-5-sulfonic acid, 2-naphthylamine-6-sulfonic acid, 2-naphthylamine-7-sulfonic acid and 2-naphthylamine-8-sulfonic acid.

Examples of preferred compounds $D^2$-$NH_2$ are

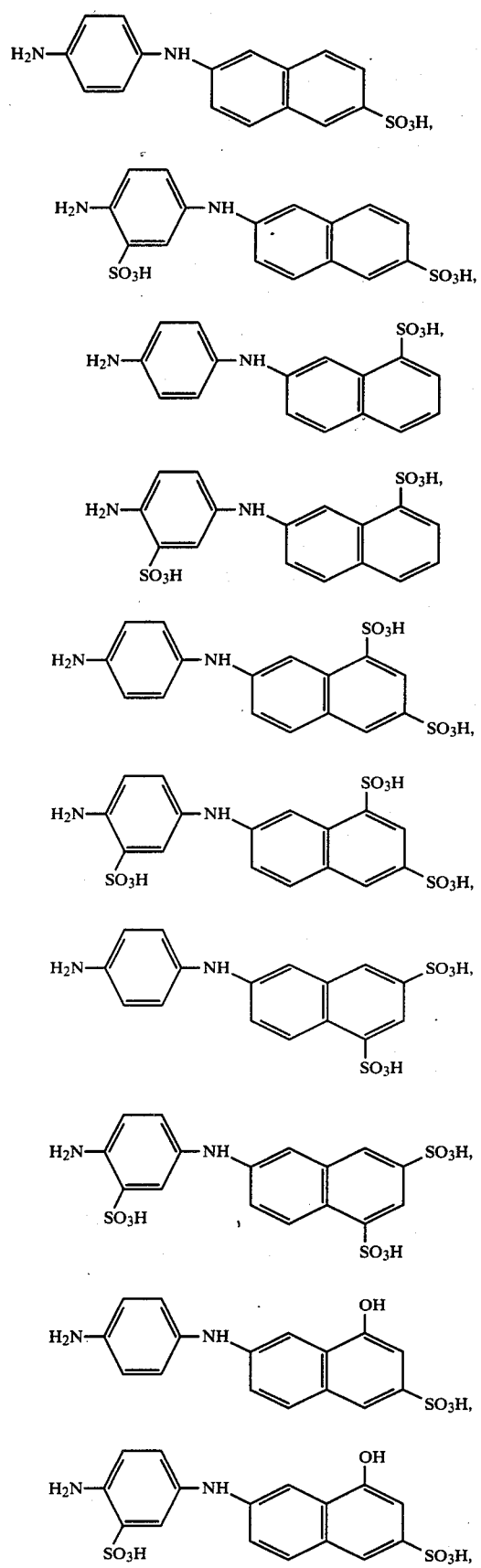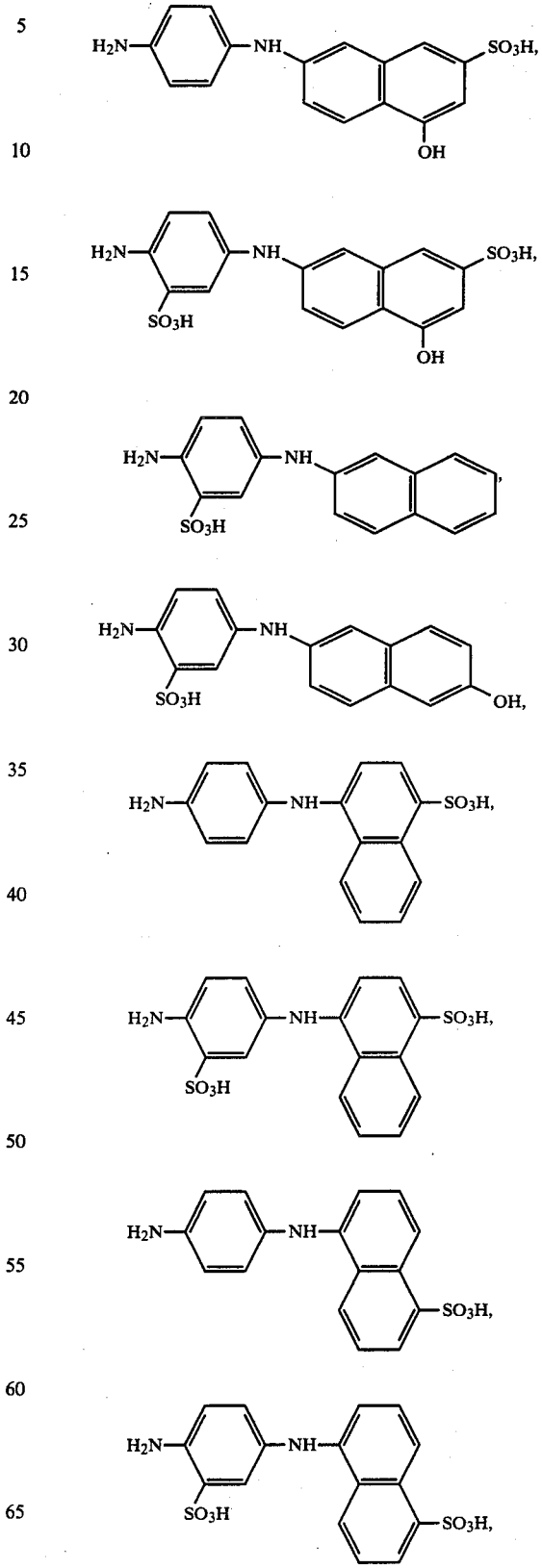

-continued

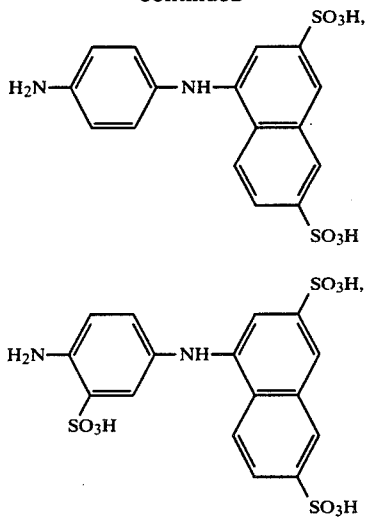

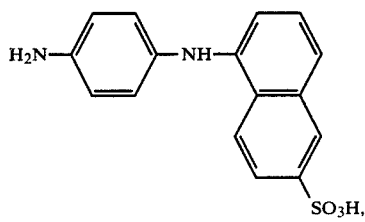

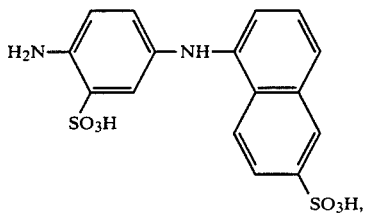

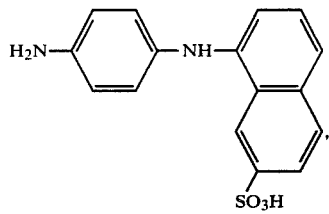

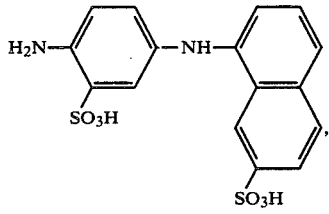

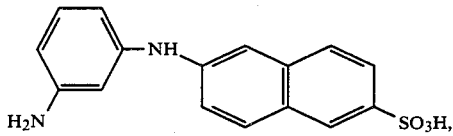

-continued

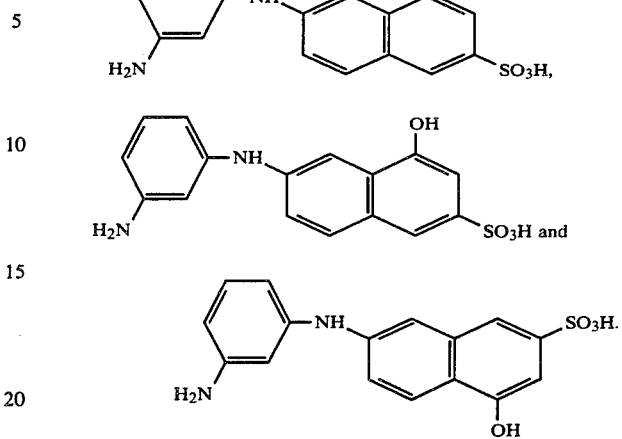

Further suitable radicals $D^1$ are those mentioned for $D^2$.

Compounds of the formula I can be prepared, for example, by reacting a diazo compound of an amine of the formula $$D^2-NH_2$$

with a compound of the formula

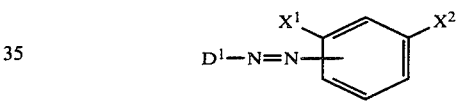

and then, if appropriate, reacting the product of the formula

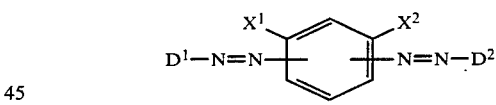

with a diazo component of an amine of the formula $$D^3-NH_2$$

and/or, if required, converting the product into the metal complex. The reactions are known in principle, and may be carried out using procedures similar to ones described.

Details of the reactions are to be found in the examples, in which parts and percentages are by weight, unless stated otherwise.

Examples of suitable metals for the metal complexes are manganese, cobalt, chromium, nickel, copper or in particular iron.

Compounds of the formula Ia or Ib

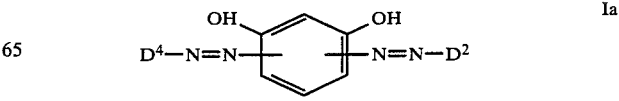

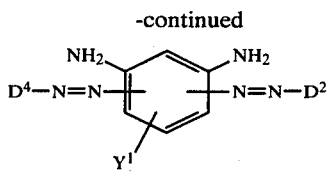

where $D^4$ is a radical of a diazo component derived from the aniline or aminonaphthalene series and having a complex-forming hydroxyl or carboxyl group adjacent to the azo bridge, $Y^1$ is hydrogen or methyl and $D^2$ has the above meanings, in the form of their iron complexes, are particularly important industrially.

Examples of preferred components $D^4$-$NH_2$ are 2-aminophenol, 2-amino-4-methylphenol, 2-amino-4-chlorophenol, 2-amino-4,6-dichlorophenol, 2-amino-3,4,6-trichlorophenol, 2-amino-4-nitrophenol, 2-amino-5-nitrophenol, 2-amino-4,6-dinitrophenol, 2-amino-4-chloro-5-nitrophenol, 2-amino-4-chloro-6-nitrophenol, 2-amino-4-nitro-6-chlorophenol, 2-amino-4-methyl-6-nitrophenol, 3-amino-4-hydroxybenzenesulfonic acid, 3-amino-4-hydroxybenzenesulfonamide, 3-amino-4-hydroxy-5-chlorobenzenesulfonic acid, 2-hydroxy-3-amino-5-chlorobenzenesulfonic acid, 2-hydroxy-3-amino-5-methylbenzenesulfonic acid, 3-amino-4-hydroxy-5-nitrobenzenesulfonic acid, 2-hydroxy-3-amino-5-nitrobenzenesulfonic acid, 2-aminophenol-4,6-disulfonic acid, 1-diazo-2-naphthol-4-sulfonic acid, 6-nitro-1-diazo-2-naphthol-4-sulfonic acid, 2-aminobenzoic acid, 2-amino-3,5-dichlorobenzoic acid, 2-amino-5-nitrobenzoic acid, 2-amino-4-hydroxysulfonylbenzoic acid and 2-amino-5-hydroxysulfonylbenzoic acid.

$D^2$ is preferably a radical of the formula

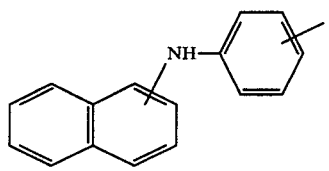

which may furthermore be substituted by chlorine, methyl or hydroxysulfonyl.

The compounds of the formula I, particularly in the form of their metal complexes, are suitable for dyeing paper pulp and nitrogen-containing fibers, eg. nylon, wool and, preferably, leather. Essentially, very fast brown hues are obtained, in particular on retanned leather.

The complexes with iron are preferred.

EXAMPLE 1

31.4 parts of 2-(4-aminophenylamino)-naphthalene-6-sulfonic acid are stirred in 100 parts by volume of water, 25 parts by volume of 5N hydrochloric acid are added and diazotization is effected at 0° C. by adding an aqueous solution of 7 parts of sodium nitrite. After 1 hour, excess sodium nitrite is destroyed by adding amidosulfonic acid, and the diazo solution is then poured into a stirred suspension, in 1,000 parts of water, of the coupling product obtained by diazotizing 23.4 parts of 2-hydroxy-3-amino-5-nitrobenzenesulfonic acid in a conventional manner and coupling the product, in a medium rendered alkali with sodium carbonate, to 11 parts of resorcinol. After the addition, the pH is increased to 10, and stirring is continued until the coupling is complete. The pH is then brought to 5 with 5N hydrochloric acid, 34 parts of iron(III) chloride are added to the dye suspension at 60°–70° C. and the pH is then brought to 4 with sodium acetate. The metallization is complete after the mixture has been stirred for one hour at 60°–70° C., and the complexed dye is then salted out at 60° C. at pH 1–2 using potassium chloride, filtered hot and dried. The resulting iron complex of the compound of the formula

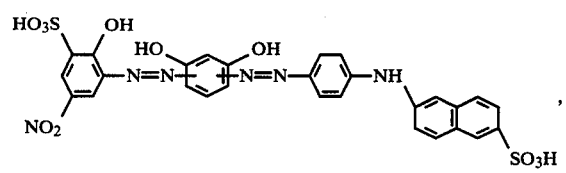

gives lightfast and wetfast brown dyeings on leather.

EXAMPLE 2

39.4 parts of 1-(4-amino-3-hydroxysulfonylphenylamino)-naphthalene-4-sulfonic acid in 200 parts by volume of water are stirred, a solution is obtained by adding 10 parts by volume of 40% strength sodium hydroxide solution, and an aqueous solution of 7 parts of sodium nitrite is added. The mixture is then acidified at 0° C. by adding 60 parts by volume of 5N hydrochloric acid, and stirring is continued for 30 minutes. Excess nitrite is destroyed with amidosulfonic acid, after which a conventionally prepared suspension of the coupling product of 29.5 parts of 6-nitro-1-diazo-2-naphthol-4-sulfonic acid and 11 parts of resorcinol is poured into the resulting diazo suspension at 0° C. The pH is increased to 10 and the mixture is stirred until coupling is complete. Thereafter, complexing is effected at 60°–70° C. with 34 parts of iron(III) chloride, as described in Example 1, and the metal complex of the dye of the formula

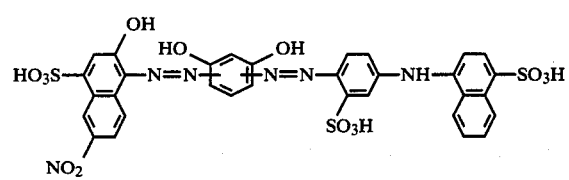

is salted out using potassium chloride, filtered and dried. The dye gives lightfast and wetfast, deep brown dyeings on leather.

The compounds listed in the table below may also be obtained by methods similar to those described.

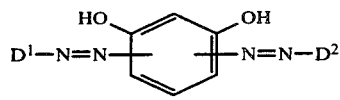

| Example No. | D¹ | D² | Dyeing on leather |
|---|---|---|---|
| 3 | 3-hydroxy-1-sulfo-7-nitronaphthyl | 6-(p-tolylamino)naphthalene-2-sulfonic acid | dark brown |
| 4 | " | 6-(p-tolylamino)naphthalene-1,3-disulfonic acid | dark brown |
| 5 | " | 4-(p-tolylamino)naphthalene-1-sulfonic acid | dark brown |
| 6 | 2,4-dinitro-6-methylphenol | 6-(p-tolylamino)naphthalene-1,3-disulfonic acid | dark brown |
| 7 | " | 4-(3-sulfo-4-methylphenylamino)naphthalene-1-sulfonic acid | dark brown |
| 8 | 3-methyl-4-hydroxybenzenesulfonic acid | 6-(p-tolylamino)naphthalene-2-sulfonic acid | brown |
| 9 | 2,4-dinitro-6-methylphenol | 7-(3-sulfo-4-methylphenylamino)naphthalene-1,3-disulfonic acid | dark brown |

-continued

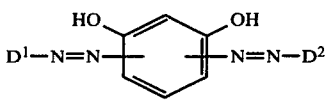

Fe complex

| Example No. | D¹ | D² | Dyeing on leather |
|---|---|---|---|
| 10 | 2-chloro-6-methyl-4-nitrophenol | 4-(3-sulfo-4-methylanilino)naphthalene-1-sulfonic acid | brown |
| 11 | " | 7-(4-methylanilino)naphthalene-1,3-disulfonic acid | brown |
| 12 | 4-methyl-3-hydroxynaphthalene-1-sulfonic acid | 6-(4-methylanilino)naphthalene-2-sulfonic acid | brown |
| 13 | " | 8-(4-methylanilino)naphthalene-2-sulfonic acid | brown |
| 14 | 3-nitro-2-hydroxy-5-methyl-benzenesulfonic acid | 4-(3-sulfo-4-methylanilino)naphthalene-1-sulfonic acid | brown |
| 15 | " | 8-(4-methylanilino)naphthalene-2-sulfonic acid | brown |
| 16 | 2-hydroxy-3-methyl-5-nitrobenzenesulfonic acid | 7-(4-methylanilino)naphthalene-1,3-disulfonic acid | brown |

-continued

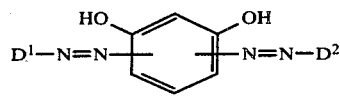

Fe complex

| Example No. | D¹ | D² | Dyeing on leather |
|---|---|---|---|
| 17 | HO₃S, OH, O₂N-substituted phenyl | p-phenyl-NH-naphthalene-1-SO₃H (4-anilino) | brown |
| 18 | " | p-phenyl-NH-naphthalene-6-SO₃H | brown |
| 19 | HO₃S, OH, HO₃S-substituted phenyl | p-phenyl-NH-naphthalene-2,6-SO₃H | brown |
| 20 | " | p-phenyl-NH-naphthalene-1-SO₃H (4-anilino) | brown |

EXAMPLE 21

39.4 parts of 2-(4-aminophenylamino)-naphthalene-6,8-disulfonic acid in 200 parts by volume of water are stirred, and a solution is obtained by adding 50 parts by volume of 5N hydrochloric acid. An aqueous solution of 7 parts of sodium nitrite is added at 0° C., the mixture is stirred for two hours and excess nitrite is then destroyed with amidosulfonic acid. The resulting diazo solution is then poured into a solution, rendered alkaline with sodium carbonate, of 22.3 parts of 1-naphthylamine-6-sulfonic acid in 300 parts by volume of water, and the pH is increased to 10. After coupling is complete, an aqueous solution of 7 parts of sodium nitrite is added, and the mixture is acidified at 0° C. with 80 parts by volume of 5N hydrochloric acid and stirred for two hours until diazotization is complete. Excess nitrite is destroyed by adding amidosulfonic acid, and a conventionally prepared suspension of the coupling product of 29.5 parts of 6-nitro-1-diazo-2-naphthol-4-sulfonic acid and 11 parts of resorcinol is added to the resulting diazo suspension at 0° C. Thereafter, the pH is increased to 9 and the mixture is stirred until coupling is complete. Metallization with iron(III) chloride and isolation by a procedure similar to that described in Example 1 gives the iron complex of the dye of the formula

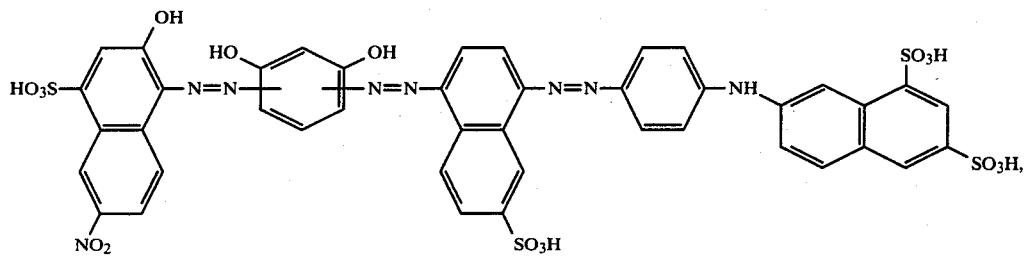

which dyes leather in lightfast and wetfast, dark brown hues.

The compounds listed in the table below may also be obtained by methods similar to that described.

aqueous solution of 7 parts of sodium nitrite is added, the mixture is acidified at 0° C. with 60 parts by volume of 5N hydrochloric acid and stirring is continued for two hours. After diazotization is complete, excess so- $$D^1-N=N-\underset{\underset{}{\bigcirc}}{\overset{HO\quad OH}{\phantom{X}}}-N=N-D^2$$

Fe complex

| Example No. | $D^1$ | $D^2$ | Dyeing on leather |
|---|---|---|---|
| 22 | [structure: OH, HO3S, O2N naphthalene] | [structure: -N=N-phenyl-NH-naphthalene-SO3H with SO3H] | brown |
| 23 | [structure: O2N, OH, O2N phenyl with methyl] | [structure: -N=N-phenyl-NH-naphthalene-SO3H, SO3H with SO3H] | brown |
| 24 | " | [structure: -N=N-phenyl(SO3H)-NH-naphthalene-SO3H with SO3H] | brown |
| 25 | [structure: HO3S, OH, O2N phenyl] | [structure: -N=N-phenyl-NH-naphthalene-SO3H with SO3H] | brown |
| 26 | " | [structure: -N=N-phenyl-NH-naphthalene with SO3H, SO3H] | brown |

EXAMPLE 27

39.4 parts of 2-(4-aminophenylamino)-naphthalene-6,8-disulfonic acid are diazotized by a procedure similar to that described in Example 21, and the diazo solution is poured into a suspension of 20 parts of 2-methyl-5-methylsulfonylaminoaniline in 500 parts by volume of water, at 0° C. The pH is then increased to 9–9.5 with 40% strength sodium hydroxide solution, and the mixture is stirred until coupling is complete. Thereafter, an dium nitrite is destroyed with amidosulfonic acid and to the resulting diazo suspension is added a suspension of the coupling component obtained by conventional diazotization of 23.4 parts of 2-hydroxy-3-amino-5-nitrobenzenesulfonic acid and coupling of the product, in a medium rendered alkaline with sodium carbonate, to 11 parts of resorcinol. After the addition, the pH is increased to 9 and the reaction mixture is stirred until coupling is complete. Metallization with iron(III) chloride and isolation by a procedure similar to that described in Example 1 gives the iron complex of the dye of the formula
which dyes leather in lightfast and wetfast brown hues.
The compounds listed in the table below may also be obtained by methods similar to that described.
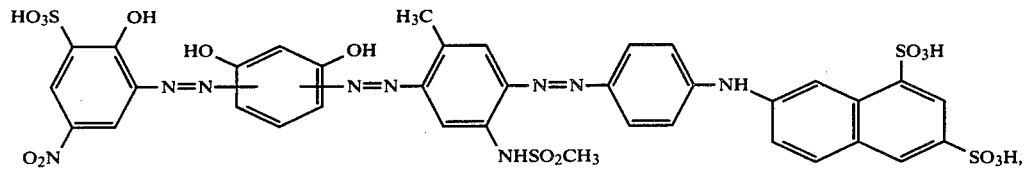

EXAMPLE 33

19.9 parts of 2-amino-4,6-dinitrophenol are diazotized in a customary manner, and the product is coupled, in a medium rendered alkaline with sodium carbonate, to 11 parts of resorcinol. A diazo solution prepared from 39.4 parts of 2-(4-aminophenylamino)-naphthalene-6,8-disulfonic acid by a procedure similar to that described in Example 21 is added to the compound obtained, the reaction mixture is rendered alkaline with sodium carbonate and stirring is continued until coupling is complete. Thereafter, the diazo solution obtained in a conventional manner from 21.8 parts of 2-amino-5-nitrobenzenesulfonic acid is run in at pH 9–9.5, and the mixture is stirred until coupling is complete. The dye obtained is then complexed with 34 parts of iron(III) chloride and isolated, these steps being carried out by procedures similar to those described in Example 1. The resulting iron complex of the compound of the formula

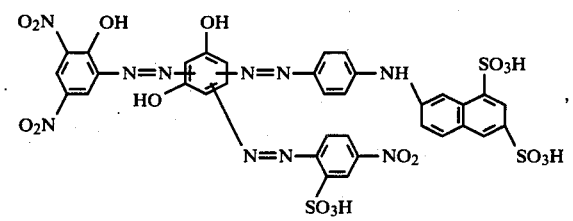

gives lightfast and wetfast, dark brown dyeings on leather.

The compounds listed in the table below may also be obtained by methods similar to those described.

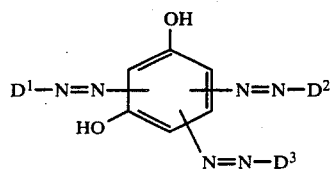

Fe complex

| Example No. | $D^1$ | $D^2$ | $D^3$ | Dyeing on leather |
|---|---|---|---|---|
| 34 | 8-HO3S, 2-OH, 6-O2N-naphthyl | -C6H4-NH-(6-naphthyl-1,3-disulfonic acid) | -C6H4-NO2 | dark brown |
| 35 | " | " | -C6H4-OCH3 | dark brown |
| 36 | 2-OH-3,5-dinitrophenyl | " | -C6H4-SO3H (meta) | dark brown |
| 37 | 2-OH-3-SO3H-5-NO2-phenyl | -C6H4-NH-(naphthyl-SO3H) | -C6H4-OCH3 (ortho) | brown |

-continued

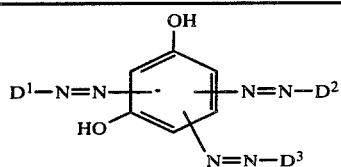

Fe complex

| Example No. | $D^1$ | $D^2$ | $D^3$ | Dyeing on leather |
|---|---|---|---|---|
| 38 | naphthol with HO₃S and OH | p-NH-naphthalene-SO₃H | phenyl-OCH₃ | dark brown |
| 39 | " | p-NH-naphthalene-1,3-(SO₃H)₂ | " | dark brown |
| 40 | naphthol with HO₃S and OH | p-NH-naphthalene-SO₃H | phenyl-NO₂ | dark brown |
| 41 | " | m-(SO₃H)-phenyl-NH-naphthalene-SO₃H | " | dark brown |

EXAMPLE 42

39.4 parts of 2-(4-aminophenylamino)-naphthalene-6,8-disulfonic acid are stirred in 200 parts by volume of water, 50 parts by volume of 5N hydrochloric acid are added and diazotization is effected at 0° C. by adding an aqueous solution of 7 parts of sodium nitrite. After 1 hour, excess sodium nitrite is destroyed by adding amidosulfonic acid, and the diazo solution is then poured into a solution, rendered alkaline with sodium carbonate, of 10.4 parts of m-phenylenediamine in 200 parts of water. Then the diazonium salt obtained from 19.9 parts of 1-amino-4,6-dinitrophenol is added at pH 8 to 9.

When coupling is complete, the pH is brought to 5 with 5N hydrochloric acid, 34 parts of iron(III) chloride are added to the dye suspension at 60°–70° C. and the pH is then brought to 4 with sodium acetate. The metallization is complete after the mixture has been stirred for one hour at 60°–70° C., and the complexed dye is then salted out at 60° C. at pH 4, filtered hot and dried. The resulting iron complex of the compound of the formula

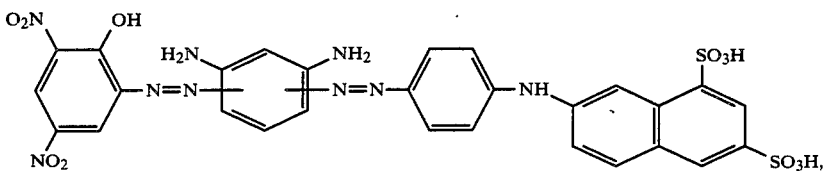

gives lightfast and wetfast brown dyeings on leather.

The dyes listed in the table below may be obtained by the method described above.

$$H_2N \quad NH_2$$
$$D^1-N=N-\overset{}{\underset{}{\bigcirc}}-N=N-D^2$$

| Example No. | $D^1$ | $D^2$ | Dyeing on leather |
|---|---|---|---|
| 43 | 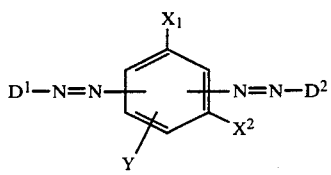 | 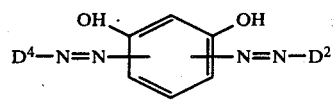 | dark brown |
| 44 | 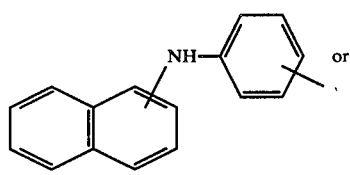 | " | brown |
| 45 | 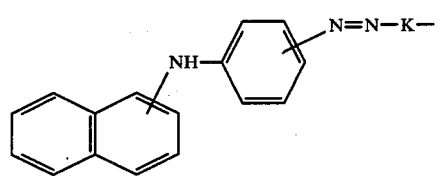 | " | brown |

We claim:

1. A polyazo dye of the formula $$D^1-N=N-\underset{Y}{\overset{X_1}{\bigcirc}}-N=N-D^2 \quad \text{I}$$

wherein
$D^1$ is a radical of a diazo component,
$X^1$ and $X^2$ independently of one another are each hydroxyl, amino, dimethylamino, diethylamino, dipropylamino, morpholino, piperidino, or pyrrolidino,
Y is hydrogen, chlorine, methyl, hydroxysulfonyl, or $D^3-N=N-$,
$D^2$ is a radical of the formula

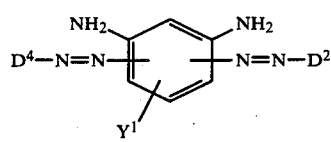

wherein either the phenyl ring or the naphthyl ring is substituted by hydroxysulfonyl, and the phenyl ring and the naphthyl ring are further unsubstituted or substituted by chlorine, methyl, methoxy, hydroxysulfonyl, aminosulfonyl, hydroxyl, acetylamino, propionylamino or benzoylamino, and
K is a radical of a benzene or naphthalene coupling component in the form of a metal complex.

2. The compound of claim 1 of the formula $$D^4-N=N-\underset{}{\overset{OH}{\bigcirc}}-\underset{}{\overset{OH}{\bigcirc}}-N=N-D^2$$

or $$D^4-N=N-\underset{Y^1}{\overset{NH_2}{\bigcirc}}-\underset{}{\overset{NH_2}{\bigcirc}}-N=N-D^2$$

wherein
$D^4$ is a radical of a diazo aminonaphthalene or aniline component having a complex-forming hydroxyl or carboxyl group adjacent to the azo bridge,
$Y^1$ is hydrogen or methyl, and
$D^2$ has the above meanings, in the form of its iron complex.

3. The compound of claim 1 in the form of the iron or copper complex.

4. A compound of the formula $$D^4-N=N-\underset{Y^2}{\overset{OH}{\bigcirc}}-\underset{}{\overset{OH}{\bigcirc}}-N=N-D^2$$

or $$D^4-N=N-\underset{}{\overset{NH_2}{\bigcirc}}-\underset{}{\overset{NH_2}{\bigcirc}}-N=N-D^2$$

wherein
$D^4$ is phenyl substituted in the o-position to the azo group by hydroxyl or carboxyl, and by a group selected from the group consisting of chlorine, bromine, methyl, ethyl, methoxy, ethoxy, sulfamoyl, N-($C_1$-$C_4$)alkyl-sulfamoyl, hydroxylsulfonyl and nitro, or naphthyl substituted by a group selected from the group consisting of hydroxy-sulfonyl and nitro;
$D^2$ is a radical of the formula

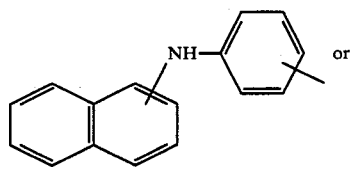

-continued

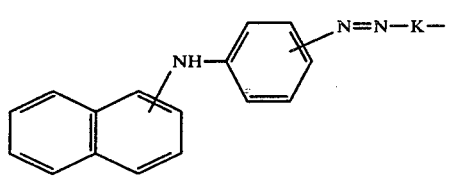

wherein the rings in the diazo component $D^2$ may be substituted by chlorine, methyl, methoxy, hydroxysulfonyl, aminosulfonyl, hydroxyl or acylamino; and $Y^2$ is hydrogen.

5. The compound of claim 4, wherein $D^2$ is

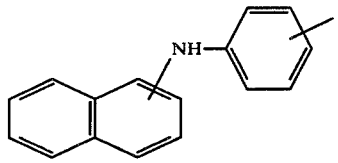

substituted once or twice in the rings by hydroxysulfonyl.

6. The compound of claim 4 of the formula

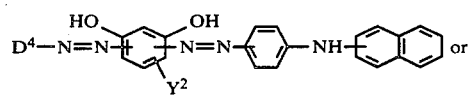

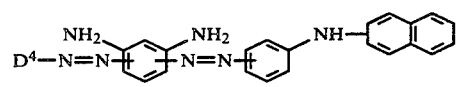

containing 1 or 2 hydroxysulfonyl groups attached to the phenyl and naphthyl rings and wherein $D^4$ is phenyl substituted by chlorine, nitro or sulfamoyl in addition to the complex-forming hydroxyl or carboxyl group at he ortho position to the azo group.

* * * * *